United States Patent [19]
Koch et al.

[11] Patent Number: 5,849,852
[45] Date of Patent: Dec. 15, 1998

[54] SUPPORT FOR CATALYSTS, PROCESS FOR THE MANUFACTURE OF A PRECURSOR GEL OF A SUPPORT FOR CATALYSTS, CATALYST FOR THE POLYMERIZATION OF OLEFINS AND PROCESS FOR THE POLYMERIZATION OF OLEFINS BY MEANS OF THIS CATALYST

[75] Inventors: Benoît Koch, Hannut; André Rulmont, Liege; Fabienne Wijzen, Ayeneux, all of Belgium

[73] Assignee: Solvay Polyolefins Europe—Belgium (Société Anonyme), Brussels, Belgium

[21] Appl. No.: 553,326

[22] PCT Filed: May 10, 1994

[86] PCT No.: PCT/EP94/01513

§ 371 Date: Jan. 29, 1996

§ 102(e) Date: Jan. 29, 1996

[87] PCT Pub. No.: WO94/26790

PCT Pub. Date: Nov. 24, 1994

[30] Foreign Application Priority Data

May 17, 1993 [BE] Belgium .................................. 9300508

[51] Int. Cl.⁶ .................................. C08F 4/02; C08F 4/24
[52] U.S. Cl. .......................... 526/96; 526/106; 526/113; 526/118; 526/130; 502/154; 502/172; 502/200; 502/201; 502/210; 502/214; 502/405; 423/305; 423/306; 423/327.1
[58] Field of Search ................................ 423/306, 327.1, 423/305; 502/154, 172, 200, 201, 210, 214, 405; 526/96, 106, 113, 118, 130

[56] References Cited

U.S. PATENT DOCUMENTS

| | | |
|---|---|---|
| 3,342,750 | 9/1967 | Kearby . |
| 4,364,839 | 12/1982 | McDaniel et al. ........................ 252/430 |
| 4,721,696 | 1/1988 | Kidd ......................................... 502/210 |
| 4,758,544 | 7/1988 | Plesko et al. . |
| 4,806,513 | 2/1989 | McDaniel et al. ........................ 502/107 |

FOREIGN PATENT DOCUMENTS

| | | |
|---|---|---|
| 0055864 | 7/1982 | European Pat. Off. . |
| 0283815 | 9/1988 | European Pat. Off. . |
| 2315997 | 1/1977 | France . |
| 2154764 | 5/1972 | Germany . |
| 1356248 | 6/1974 | United Kingdom . |
| 2090158 | 7/1982 | United Kingdom . |

*Primary Examiner*—Mark Nagumo
*Attorney, Agent, or Firm*—Spencer & Frank

[57] ABSTRACT

Support for catalysts, containing at least two constituents chosen from silica, alumina and aluminium phosphate, having a specific surface of 100 to 800 m²/g, a crystallization temperature greater than or equal to 700° C. and a pore volume of 1.5 to 4 cm³/g, the specific surface (SS) and the pore volume (PV) corresponding to the relationship:

$$SS < (PV \times 564 - 358).$$

Process for the manufacture of such a support, according to which an alcohol, water, a silicon alkoxide and an acid are mixed under conditions such that gelling or precipitation of silica is prevented, an acidic solution of an aluminium compound and/or a solution of a source of phosphate ions are added thereto, a gelling agent is added thereto, a gel is recovered which is washed with water and then by means of an organic liquid, the gel is then dried until a powder is obtained, and the powder is calcined. Polymerization of olefins in the presence of a catalyst containing chromium on a support as described above.

43 Claims, 1 Drawing Sheet

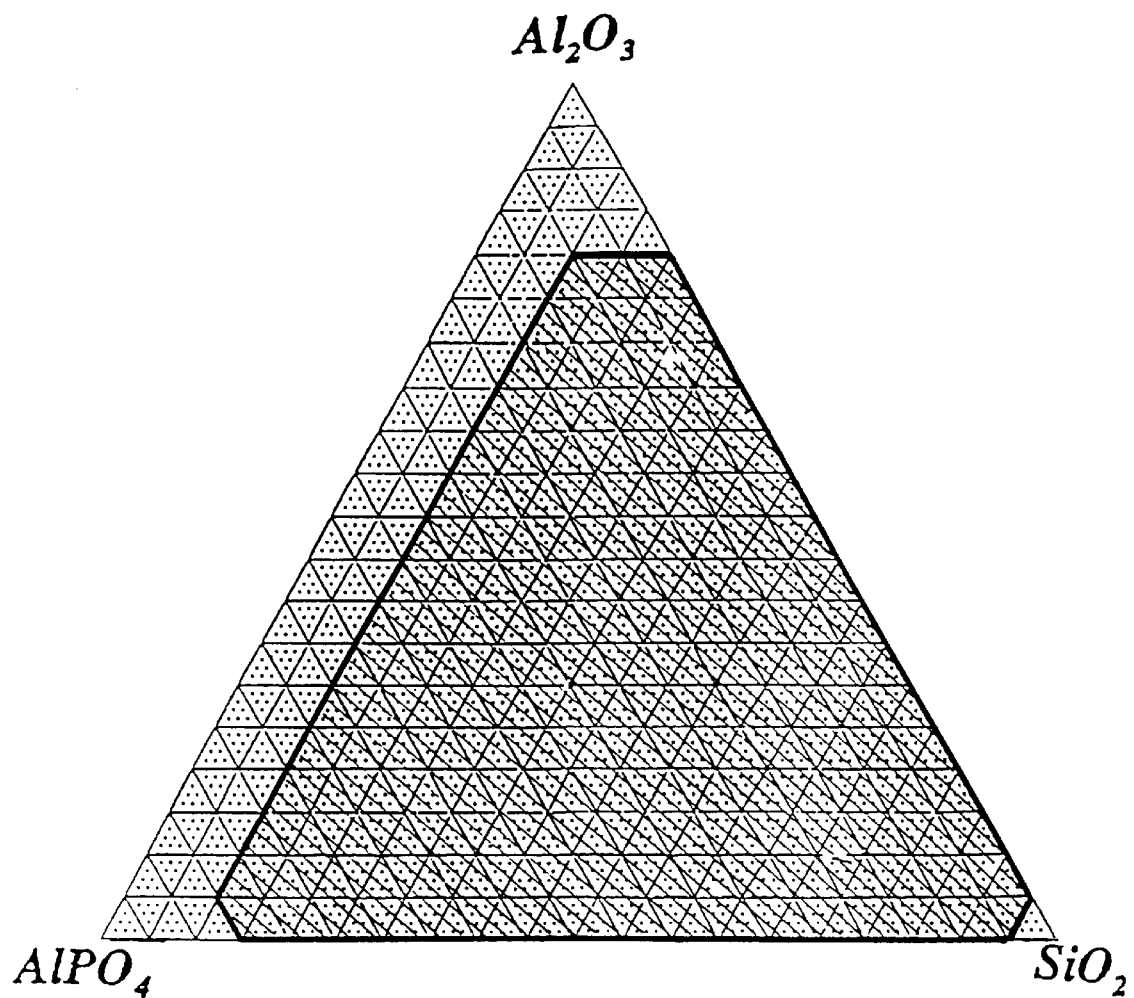

SUPPORT FOR CATALYSTS, PROCESS FOR THE MANUFACTURE OF A PRECURSOR GEL OF A SUPPORT FOR CATALYSTS, CATALYST FOR THE POLYMERIZATION OF OLEFINS AND PROCESS FOR THE POLYMERIZATION OF OLEFINS BY MEANS OF THIS CATALYST

The present invention relates to a support for catalysts containing at least two constituents chosen from silica, alumina and aluminium phosphate, in particular a ternary support consisting of silica, alumina and aluminium phosphate. The invention also relates to a process for the manufacture of a precursor gel of such a support, containing silica, as well as to a process for manufacturing a support from the said precursor gel. Additionally, it relates to catalysts for the polymerization of olefins containing chromium on such a support, as well as to the use of these catalysts in the polymerization of olefins.

Supports consisting of mixtures of oxides are known. For instance, the patent application EP-A-283 815 describes compositions containing alumina and silica suitable for the treatment of liquid hydrocarbons. The patent application FR-A-2 315 997 describes supports containing alumina and aluminium phosphate suitable for the conversion of hydrocarbons.

U.S. Pat. No. 4,758,544 (Chevron Research Company) describes a support for catalysts composed of alumina, aluminium phosphate and silica having a mean radius of the pores of 10 to 300 Å, a specific surface of 50 to 400 $m^2/g$ and a pore volume of 0.1 to 1.5 $cm^3/g$ which is suitable for the hydrodenitrification of oils.

U.S. Pat. No. 3,342,750 (Esso) discloses the preparation of supports for catalysts, containing aluminium phosphate and silica, whose specific surface is, for example, equal to 403 $m^2/g$ and the pore volume to 0.77 $cm^3/g$.

A description is given, in Example IA of patent application GB-A-2,090,158 (Phillips Petroleum Company), of a process for the preparation of a support for catalysts composed of silica and aluminium phosphate, according to which a solution containing isopropanol, water, phosphoric acid, silicon ethoxide and sulphuric acid is prepared, aluminium nitrate, aminodihydroxyphosphine and chromium nitrate are added thereto and ammonium hydroxide is introduced therein to produce cogelling.

These known supports show a high degree of heterogeneity and consequently crystallize very quickly when they are calcined at temperatures greater than 700° C. Moreover, these supports do not simultaneously combine a high specific surface with a high pore volume. The result thereof is that these known supports do not make it possible to manufacture chromium-based catalysts for the polymerization of olefins which show, at the same time, a high catalytic activity, a low induction period for the polymerization and a good response to hydrogen. Moreover, they do not make it possible to obtain polyolefins having a molecular mass distribution which can be adjusted between a moderately broad distribution and a very broad distribution for a given melt index and they generally give rise to a significant formation of oligomers.

The invention overcomes these disadvantages by providing a new support, of homogeneous and amorphous structure, which is resistant to crystallization, which simultaneously possesses a high pore volume and a high specific surface, and which, when it is used as a support for a chromium-based catalyst in the polymerization of olefins, confers the following combined advantages on this catalyst:

a high catalytic activity even in the absence of a cocatalyst,
a low, indeed non-existent, period of induction for the polymerization,
a good response to hydrogen, this catalyst making it possible to obtain polyolefins having:
a molecular mass distribution which can be adjusted between a moderately broad distribution and a very broad distribution for a given melt index, and
a low oligomer fraction.

Consequently, the invention relates to a support for catalysts containing at least two constituents chosen from silica, alumina and aluminium phosphate; according to the invention, the support has a specific surface of 100 to 800 $m^2/g$, a crystallization temperature greater than or equal to 700° C. and a pore volume of 1.5 to 4 $cm^3/g$, the specific surface (SS) and the pore volume PV corresponding to the following relationship:

$$SS < (PV \times 564 - 358),$$

in which SS and PV are respectively the numerical values of the specific surface, expressed in $m^2/g$, and of the pore volume, expressed in $cm^3/g$.

According to the invention, the specific surface (SS) of the support is measured according to the BET volumetric method of British standard BS 4359/1 (1984); the pore volume (PV) is the sum of the pore volume consisting of pores with a radius less than or equal to 75 Å, measured by the method of penetration with nitrogen (BET) according to the volumetric technique described in British Standard BS 4359/1 (1984), and of the pore volume measured by the method of penetration with mercury using the porosimeter of Poro 2000 type marketed by Carlo Erba Co, according to Belgian standard NBN B 05-202 (1976).

According to the invention, the crystallization temperature of the support is determined by subjecting a sample of the support to a heat treatment at different temperatures (500° C. 700° C. 800° C. 950° C. and 1050° C.) and by then examining this sample, after each heat treatment, by X-ray diffraction.

According to an advantageous variant of the invention, the support is of binary type containing silica (A) and a constituent (B) chosen from alumina and aluminium phosphate, preferably in an (A):(B) molar percentage of (10 to 95):(90 to 5).

According to another variant of the invention, which is preferred, the support is of ternary type containing silica (X), alumina (Y) and aluminium phosphate (Z), preferably in an (X):(Y):(Z) molar percentage of (10 to 95):(1 to 80):(1 to 85).

According to yet another variant of the invention, which is particularly preferred, the support contains, in addition to at least two constituents chosen from silica, alumina and aluminium phosphate, titanium, generally in the form of titanium dioxide. The amount of titanium present in the support according to the invention, expressed as a molar percentage of $TiO_2$, is generally at least equal to 0.1 mol %, preferably to 0.5 mol %, the values of at least 1 mol % being the most common. The amount of titanium, expressed as a molar percentage of $TiO_2$, most often does not exceed 40 mol %, more particularly does not exceed 20 mol %, the values of at most 15 mol % being recommended.

The support according to the invention is generally provided in the form of a powder whose particles have a diameter of 20 to 200 µm.

The support according to the invention generally has an apparent density greater than or equal to 50 $kg/m^3$, in particular greater than 100 kg/m³; it is generally at most equal to 500 kg/m³, typically at most equal to 300 kg/m³. In the preceding definition of the apparent density, the latter is measured by free flow according to the following procedure: the powder of the support to be analysed is poured, while avoiding packing it down, into a cylindrical container with a capacity of 50 cm³, the powder being poured from a hopper whose lower edge is arranged 20 mm above the upper edge of the container. The container is then weighed while filled with the powder, the tare of the recorded weight is deducted and the result obtained (expressed in g) is divided by 50.

In addition to silica, alumina and/or aluminium phosphate, and/or, if appropriate, titanium, the support according to the invention can optionally contain additional substances. It can, for example, be traces of elements from groups IA and IIA of the periodic table or of metals such as iron. These elements must, however, be present in limited amounts not exerting an influence on the intrinsic properties of the support.

The invention also relates to a process for the manufacture of a precursor gel of a support in accordance with the invention, such as described above, according to which, in a first stage, an alcohol, water, a silicon alkoxide and an acid are mixed in amounts such that the water/silicon molar ratio is from 2 to 50, an acidic solution of an aluminium compound and/or a solution of a source of phosphate ions, in a second stage, and, in a third stage, a gelling agent are added to the hydrolysis medium thus obtained; according to the invention, the first stage is carried out at acid pH and comprises, on the one hand, the addition of water, acid, silicon alkoxide and alcohol, the temperature, during the addition, being less than or equal to 30° C. and, on the other hand, a maturing of the hydrolysis medium thus obtained at a temperature at least equal to 20° C. and lower than the boiling temperature of the medium, so as to substitute at least part of the alkoxy groups of the silicon alkoxide by hydroxyl groups, without producing gelling or precipitation of silica.

In the process according to the invention, the silicon alkoxide used in the first stage can be any compound in which silicon is bonded to at least one alkoxy group, such as a substituted or unsubstituted, saturated or unsaturated, linear, branched or cyclic aliphatic or aromatic alkoxy. The alkoxy groups generally comprise from 1 to 20 carbon atoms. Silicon alkoxides comprising alkoxy groups of aliphatic type are especially recommended; those comprising alkoxy groups of unsubstituted saturated aliphatic type are preferred, such as, for example, methyl, ethyl, n-propyl, isopropyl, n-butyl and isobutyl groups. Silicon alkoxides which are well suited are silicon tetraethoxide, tetramethoxide and tetra-isopropoxide. Silicon tetraethoxide is very particularly preferred. Of course, a number of silicon alkoxides can be used in the first stage of the process according to the invention.

In the process according to the invention, the alcohol used in the first stage has the function of dissolving the silicon alkoxide. In principle, any alcohol which dissolves the silicon alkoxide and which is miscible with water may be suitable. Thus, it is possible to use an alcohol in which the hydrocarbon group can be unsubstituted or partially or totally substitued, linear or cyclic, aromatic or aliphatic, or saturated or unsaturated. Linear aliphatic alcohols are preferred. Mention may be made, as examples, of ethanol, isopropanol and methanol. Ethanol is very particularly preferred. It is obvious that it is possible to use a number of alcohols simultaneously in the first stage of the process according to the invention. An alcohol is preferably used in which the hydrocarbon group corresponds to that of the alkoxy group of the silicon alkoxide used.

The amount of alcohol used in the first stage of the process according to the invention must be sufficient to make it possible for the silicon alkoxide to completely dissolve and consequently depends on the silicon alkoxide and alcohol selected, on the solubility of the silicon alkoxide in the alcohol and on the temperature at which the first stage is carried out. In practice, there is no advantage in using an amount which is much greater than the minimum amount necessary, because a large excess would lead to a pointless dilution of the mixture resulting from the first stage, which is to be avoided.

The first stage of the process according to the invention has the object (a) of partially hydrolysing the silicon alkoxide in the presence of water and (b) of partially condensing the hydrolysed silicon alkoxide, according to the following reactions:

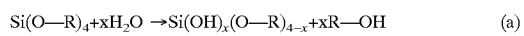

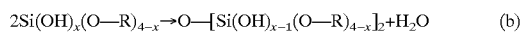

or

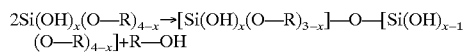

in which R represents a hydrocarbon radical which can be aromatic or aliphatic, saturated or unsaturated, or linear, branched or cyclic, which can optionally be different in the four groups (O—R), and x represents a number greater than 0 and less than 4, preferably from 0.1 to 3.9. In the first stage, an amount of water is used such that the molar ratio of this amount of water to the amount of silicon alkoxide used is from 2 to 50. Preferably, this molar ratio is from 2 to 20, more particularly from 8 to 12, for example approximately 10.

The expression "hydrolysed and condensed silicon alkoxide" is subsequently understood to denote the compounds O—[Si(OH)$_{x-1}$(O—R)$_{4-x}$]$_2$ and [Si(OH)$_x$(O—R)$_{3-x}$]—O—[Si(OH)$_{x-1}$(O—R)$_{4-x}$] as defined above.

One of the essential characteristics of the process according to the invention is the combination of operating conditions, in the first hydrolysis stage, such that any precipitation or gelling of silica in the hydrolysis medium is avoided. To this end, the mixing in the first stage is carried out under specific conditions regarding the pH and the temperature of the hydrolysis medium, the molar ratio of the amounts of water and silicon alkoxide used, and the way of mixing the reactants. The term hydrolysis medium is understood to denote the medium obtained after mixing water, acid, silicon alkoxide and alcohol. To this end, in the first stage of the process according to the invention, the pH of the hydrolysis medium is acidic. In general, the pH is less than 3, preferably from 0.5 to 2.5, for example approximately equal to 1. The acid used in the first stage can be inorganic or organic in nature. It is advantageously chosen from acids which are miscible with water and whose anion can be easily removed in a subsequent treatment of the precursor gel. It can, for example, be hydrochloric, nitric, phosphoric or sulphuric acid. Hydrochloric acid or nitric acid is preferably used. Hydrochloric acid is particularly well suited. It is optionally possible to use a number of acids in the first stage of the process according to the invention. The amount of acid must be sufficient to keep the pH acidic throughout the duration of the first stage. The amount of acid consequently depends on the degree of acidity of the acid used and the other reactants and on the temperature at which the first stage is carried out. There is no advantage in using an excessively high amount of acid in order to avoid having to remove the excess of acid or of its derivatives in a subsequent treatment stage of the precursor gel.

In the first stage of the process according to the invention, it is important to mix the reactants in a controlled way in order to prevent precipitation or gelling of silica and to prevent the mixture from heating up. To this end, the reactants can be mixed by any known appropriate means provided that the temperature during the addition of the reactants is at most equal to 30° C. and that neither precipitation nor gelling of silica takes place. Mixing is preferably carried out by addition of a premix comprising the water and the acid to a premix containing the silicon alkoxide and the alcohol. This can be carried out by adding the water/acid premix to the alcohol/silicon alkoxide premix. Another method consists in adding the alcohol/silicon alkoxide premix to the water/acid premix. Good results are obtained by adding one of the premixes dropwise to the other premix kept stirred. Particularly satisfactory results are obtained by adding the water/acid premix, dropwise and with stirring, to the alcohol/silicon alkoxide premix.

In the first stage of the process according to the invention, the temperature, during the addition of the reactants, is kept below 30° C., preferably below 20° C., typically approximately 10° C., temperatures greater than 0° C. being recommended; the hydrolysis medium is then matured at a temperature at least equal to 20° C. and lower than the boiling temperature of the medium, for example from 30° to 100° C. temperatures from 40° to 80° C. being most common and those from 50° to 70° C. being recommended.

Maturing of the hydrolysis medium is preferably carried out at a temperature greater than that of the addition of the reactants.

In the first stage of the process according to the invention, the maturing has the function of making possible progressive hydrolysis and condensation of the silicon alkoxide according to the reactions defined above. Everything else remaining equal, the degree of hydrolysis of the alkoxide becomes higher (the number x becomes greater) as the duration of the maturing increases. The duration of maturing must consequently be sufficient for the hydrolysis reaction as described above to take place; however, it must be less than the time required for gelling or precipitation of silica to take place. The optimum duration of the maturing depends on the pH of the hydrolysis medium, on the nature of the reactants present in the hydrolysis medium and on the temperature and can vary from a few minutes to several tens of hours. Generally, the duration does not exceed 24 hours. Preferably, the duration is from 0.5 to 3 hours.

In a particularly advantageous embodiment of the process according to the invention, a titanium alkoxide is additionally used in the first stage. The titanium alkoxide can, for example, be a compound in which the titanium is bonded to at least one alkoxy group, such as an unsubstituted or substituted, saturated or unsaturated, linear, branched or cyclic, aliphatic or aromatic alkoxy. The alkoxy groups generally comprise from 1 to 20 carbon atoms. The titanium alkoxide is preferably soluble in the hydrolysis medium. Titanium acetylacetonate is also particularly well suited. Of course, it is possible to use a number of titanium alkoxides in the first stage of the process according to the invention. The titanium alkoxide can optionally be used in the form of a solution in a liquid hydrocarbon. Alcohols are well suited.

The amount of titanium alkoxide used in this embodiment is generally such that the titanium is present in the precursor gel in a proportion varying from 0.05 to 20% by weight, preferably from 0.1 to 15% by weight, more particularly from 0.5 to 10% by weight of titanium based on the total weight of the solid fraction of the precursor gel.

In this embodiment, the titanium alkoxide can be used at any time in the first stage. The titanium alkoxide can, for example, be added to the premix comprising the water and the acid or to the premix containing the silicon alkoxide and the alcohol. As a variant, the titanium alkoxide can be added to the hydrolysis medium obtained after mixing water, acid, silicon alkoxide and alcohol, before, during or after maturing. Good results are obtained when the titanium alkoxide is added during the maturing. It is recommended to add the titanium alkoxide after a first part of the maturing, which advantageously represents from 40 to 60%, for example approximately 50%, of the total duration of the maturing, the second part being carried out after the addition of the titanium alkoxide.

This embodiment proves to be especially advantageous when it is desired to incorporate the titanium in the precursor gel in a high amount, which can range up to 20% by weight of the total weight of the solid fraction of the precursor gel, while preventing the formation, in a subsequent stage, of crystalline titanium dioxide agglomerates in the "anatase" or "rutile" form.

The aluminium compound used in the second stage of the process according to the invention can be any aluminium compound which is soluble in the acidic solution used in the second stage and which is capable of being gelled under the effect of a gelling agent. Inorganic aluminium salts and aluminium alkoxides are especially recommended. Use is generally made, among aluminium alkoxides, of those in which the aluminium is bonded to at least one alkoxy group. Among aluminium alkoxides, those containing aliphatic groups are especially recommended; those containing unsubstituted, saturated, linear aliphatic groups are preferred, such as, for example, methyl, ethyl, n-propyl, isopropyl, n-butyl and isobutyl groups. Use is preferably made of an aluminium alkoxide in which the alkoxy groups contain from 1 to 20 carbon atoms. Aluminium alkoxides in which the alkoxy group corresponds to that of the silicon alkoxide used are particularly well suited.

Satisfactory results are obtained with inorganic aluminium salts. Aluminium nitrate and chloride are particularly preferred among inorganic aluminium salts.

In a specific embodiment of the process according to the invention, in which an aluminium alkoxide is used as aluminium compound, the latter is used, at least in part, in the first stage of the process according to the invention, preferably, if appropriate, in the alcohol/silicon alkoxide premix. The aluminium alkoxide can also be added on conclusion of the first stage, after the maturing.

In the process according to the invention, the term source of phosphate ions denotes any compound which is soluble in the solution used in the second stage and which is capable of forming phosphate ions therein. Inorganic phosphate salts [for example, monocalcium phosphate of formula $CaH_4(PO_4)_2$, disodium phosphate of formula $Na_2HPO_4$ and tricalcium phosphate of formula $Ca_3(PO_4)_2$], phosphate esters [for example, ethyl phosphate of formula $(C_2H_5)_3PO_4$] and phosphoric acid are especially recommended. Phosphoric acid is preferably used.

The acidic solution of the aluminium compound and the solution of the source of phosphate ions used in the second stage of the process according to the invention can be prepared by any known appropriate means and are preferably miscible with the mixture obtained in the first stage of the process according to the invention.

In an advantageous embodiment of the process according to the invention, the source of phosphate ions is added beforehand to the acidic solution of the aluminium compound so that, in the second stage of the process according to the invention, only a single, acidic, solution comprising simultaneously the aluminium compound and the source of phosphate ions is used.

In a first variant of this embodiment of the process according to the invention, where the acidic solution contains only the aluminium compound and is free from a source of phosphate ions, the acidic solution is generally obtained by dissolving the aluminium compound in an amount of water and/or of an alcohol which is sufficient to ensure complete dissolution and by adding thereto an acid in an amount sufficient to prevent the formation of aluminium hydroxide, which would immediately precipitate and would consequently no longer participate in the formation of the precursor gel. Water is preferably used to dissolve the aluminium compound. In practice, there is no advantage in using an amount of solvent (water or alcohol) greater than the minimum amount necessary, because any excess solvent would involve removing it during the subsequent drying treatment of the gel. The acid used can be chosen from those which can be used in the first stage of the process according to the invention.

In a second variant of this embodiment of the process according to the invention, where the acidic solution contains only the source of phosphate ions and is free from an aluminum compound, the acidic solution is generally prepared by dissolving the source of phosphate ions in a sufficient amount of water and/or of alcohol and preferably without an extravagant excess, for the grounds stated above. In this second variant, the source of phosphate ions confers an acidic nature on the solution, so that it is pointless to add an additional acid to the solution.

In a third variant of this embodiment of the process according to the invention, which is preferred, the solution simultaneously contains the aluminium compound and the source of phosphate ions and the acidic solution is obtained by dissolving the aluminium compound and the source of phosphate ions in any order in an amount of water and/or of alcohol which is sufficient but without extravagant excess, for the grounds stated above. In this preferred variant, it can prove to be pointless additionally to add an acid thereto, provided that the source of phosphate ions confers an acidity on the solution which is sufficient to prevent the formation of aluminium hydroxide.

It is obvious that it is possible to use simultaneously, in the second stage, a number of aluminium compounds and/or a number of sources of phosphate ions.

In the second stage of the process according to the invention, the addition of the acidic solution of the aluminium compound and of the solution of the source of phosphate ions to the mixture obtained in the first stage can, for example, be carried out by pouring the mixture resulting from the first stage into one of the two solutions or into the mixture of these two solutions (the acidic solution of the aluminium compound and the solution of the source of phosphate ions). As a variant, the mixture of the two solutions can be added to the mixture resulting from the first stage, in which case it is preferable, in order to prevent the medium thus obtained from heating up, to carry out the addition very slowly by introducing the mixture of the two solutions dropwise into the medium, with vigorous stirring, the medium being thermostatically controlled at a temperature below 30° C. typically below or equal to 20° C. for example between 0° and 10° C. throughout the duration of the addition.

The gelling agent used in the third stage of the process according to the invention is any compound capable of causing cogelling of the reactants used in the first and the second stage (the hydrolysed and condensed silicon alkoxide resulting from the first stage and defined above, the aluminium compound and/or the source of phosphate ions and optionally the titanium alkoxide) in the form of a mixed oxide of silicon and of aluminium and/or of phosphorus and optionally of titanium. Mention may be made, as examples of gelling agent, of ethylene oxide, ammonium carbonate and ammonium hydroxide. An aqueous ammonium hydroxide solution is preferably used.

The amount of gelling agent used in the third stage is preferably sufficient to make it possible for the hydrolysed and condensed silicon alkoxide defined above, the aluminium compound and the phosphate compound present in the cogelling medium to be completely gelled. The term cogelling medium is understood to denote the reaction mixture in the course of gelling in the third stage of the process. The cogelling medium consequently comprises the medium obtained on conclusion of the second stage of the process according to the invention (comprising the hydrolysed and condensed silicon alkoxide, the aluminium compound and/or the source of phosphate ions) and the gelling agent. The amount of gelling agent used is advantageously sufficient to make it possible for the total mass of hydrolysed and condensed silicon alkoxide, of aluminium compound and of source of phosphate ions to be completely cogelled; it is preferably slightly greater than this sufficient amount.

In the third stage of the process according to the invention, the pH of the cogelling medium is generally greater than or equal to 5, typically greater than or equal to 6; it is usually less than 11, values less than 10 being recommended. The pH is preferably kept constant at a value of 6 to 10, for example 8, throughout the duration of the cogelling. The steadiness of the pH can be provided by any known appropriate means, for example by using a buffer which is inert with respect to the reactants in the course of gelling, or by using equipment which makes it possible to control the, continuous tinuous or non-continuous, supply into the cogelling medium of a compound which modifies the pH. Use is preferably made of a receptacle containing the gelling agent, into which the mixture resulting from the second stage and a pH-regulating compound are introduced separately and in a controlled way. It is possible to employ, as pH-regulating compound, any acidic or basic compound which is inert with respect to the reactants in the course of gelling.

In the third stage of the process according to the invention, it can prove to be advantageous, depending on the properties of the precursor gel which it is desired to obtain, to thermostatically control the cogelling medium at a temperature below or equal to 30° C. preferably at a temperature of 0° to 20° C.

In a first particularly advantageous embodiment of the process according to the invention, it is possible additionally to incorporate, in the precursor gel, a transition metal chosen from the elements of groups IVB and VB of the periodic table, such as zirconium and vanadium, or an element of group IIIA of the periodic table, other than aluminium, such as boron. To this end, an organic or inorganic salt or an alkoxide of one of these elements is added to the mixture obtained in the first or in the second stage of the process according to the invention, before carrying out the following stage. If appropriate, it is possible to add the salt or the alkoxide to the water/acid premix or to the alcohol/silicon alkoxide premix used in the first stage of the process according to the invention.

In a second embodiment of the process according to the invention, which is preferred, the gel resulting from the third stage is subjected to a maturing. The latter is carried out in a maturing medium, which can be the cogelling medium recovered from the third stage, optionally with stirring. An inert compound which modifies the pH of the maturing medium, for example a basic compound, can be added thereto. As a variant, the gel is first separated from the cogelling medium, for example by centrifuging, and is then resuspended in an inert liquid such as water or an alcohol in order to carry out the maturing. This variant has the advantage of removing part of the ionic impurities adsorbed in the gel, arising from the reactants used during the manufacture of the gel.

The maturing has the function of prolonging the cogelling and thus modifying the specific surface and pore volume of the gel. It is usually carried out at a temperature which can vary from room temperature up to the boiling temperature of the maturing medium. Maturing is preferably carried out at approximately 20° C. The duration of the maturing depends on the temperature and on the required properties (specific surface and pore volume) of the support. It can consequently be from a few minutes to several tens of hours. The best results are obtained with a duration of at least one hour. For considerations of an economic nature, there is no advantage in prolonging the maturing beyond 48 hours.

The maturing is generally carried out at a pH greater than or equal to 6, preferably from 8 to 10.

The process according to the invention makes it possible, with a single procedure, to prepare precursor gels of supports for catalysts containing silicon, aluminium and/or phosphorus in a wide range of concentrations. In effect, the process according to the invention makes it possible to cover the entire ternary diagram between the composition of silica, alumina and aluminium phosphate. The appended figure represents this ternary phase diagram. The process according to the invention appears particularly outstanding for the manufacture of gels in which the dry fraction has its composition situated in the shaded part of the said ternary phase diagram. The process according to the invention also makes it possible to incorporate a transition metal or an element such as boron in the precursor gel.

The process according to the invention makes it possible to prepare gels which show a very homogeneous dispersion of the constituents and which are capable of being converted to supports for catalysts showing, in combination, a specific surface, a pore volume and a resistance to crystallization which make them outstanding in the polymerization of olefins.

Another subject of the invention is consequently a process for the preparation of a support for catalysts, according to which a precursor gel is prepared by means of the process according to the invention as described above, the gel is washed with water and then by means of an organic liquid, it is then dried by distillation until a powder is obtained, and the powder is calcined.

In the process according to the invention for the preparation of a support, the gel is washed, first with water and then by means of an organic liquid.

The washing with water generally consists in suspending the gel in an amount of water which is sufficient to remove at least part of the impurities contained in the gel and in then removing at least part of this amount of water by any known appropriate means, for example by centrifuging or by filtering. The removal is preferably carried out by centrifuging, taking into account the speed of this method. Of course, it is possible to repeat this washing with water a number of times. The temperature at which this washing is carried out has little influence on the efficiency of the washing and can consequently vary to a large extent. Washing is preferably carried out at room temperature.

The water-washed gel is then washed by means of an organic liquid, for example by dispersing the gel in this organic liquid at room temperature. The washing with the organic liquid has the function of removing at least part of the water which impregnates the gel. The organic liquid selected must be at least partially miscible with water and inert with respect to the gel but, however, capable of wetting the gel. It preferably has an evaporation temperature below 120° C. typically below 100° C. for example from 70° to 90° C. Organic liquids which can be used in this washing are alcohols, ethers or their mixtures. Alcohols are preferred, particularly those comprising from 1 to 4 carbon atoms. Isopropanol is well suited. Of course, it is possible to repeat this washing by means of an organic liquid a number of times and simultaneously to use a number of organic liquids. On conclusion of the washing, it is desirable to separate the gel from at least part of the water and organic liquid used by centrifuging or by filtering.

In the process according to the invention for the preparation of a support, the washed gel is dried by distillation, in order to evaporate the water and the organic liquid which have not been previously removed, until a powder of the support is obtained. The distillation can be carried out at atmospheric pressure or at reduced pressure. Distillation is preferably carried out at atmospheric pressure.

In a specific variant of this embodiment, an organic liquid is selected, for washing the gel, which forms an azeotrope with water and, during the drying, the azeotrope is first distilled until at least 95%, preferably at least 98%, of the water and part of the organic liquid have been removed and then the residue of the organic liquid still present in the gel is distilled. In this specific embodiment, depending on the amount of water present in the gel after the washing, it is sometimes necessary to add an additional amount of organic liquid to the washed gel in order to make possible maximum removal of the water in the form of the water/organic liquid azeotropic mixture. In this specific embodiment, there is obtained, on conclusion of the drying, a powder generally containing a moisture content below 1% by weight, preferably below 0.5% by weight, for example below 0.2% by weight.

On conclusion of the drying by distillation, a powder of the support is recovered which can optionally be sieved in order to separate therefrom the particles of undesired size. This powder is calcined. The calcination has the function of extracting, at high temperature, the organic impurities from the powder. It is generally continued until the weight of the powder remains constant with time, while avoiding crystallization of the powder. The calcination can be carried out under air (preferably under dry air) in a fluidized bed at a temperature below the crystallization temperature of the powder. The temperature is generally from 300° to 1500° C. typically from 350° to 1000° C. preferably from 400° to 600° C.

In the process according to the invention for the preparation of a support, it can prove to be desirable for the precursor gel obtained in the abovementioned third stage to be ground, then suspended in a liquid, followed by spraying the suspension of the precursor gel as droplets. It is possible to use, as liquid, any dispersant which is inert with respect to the gel, for example water. The particles recovered from the spraying are then successively washed with water and by means of an organic liquid, dried by distillation and calcined, as described above. As a variant, the spraying can be carried out after the washing with water.

The process according to the invention for the preparation of a support makes it possible to obtain supports containing mixed oxides of silicon and of aluminium and/or of phosphorus showing a homogeneous dispersion of the constituents, combining a high specific surface and a high pore volume and being provided in the amorphous state with a high resistance to crystallization.

In view of its physical and structural characteristics, the support according to the invention finds a particularly advantageous application as a support for catalysts in the polymerization of olefins, the catalyst advantageously consisting of chromium oxide.

Moreover, the supports prepared from a precursor gel additionally containing titanium obtained according to the particularly advantageous embodiment described above make it possible to obtain catalysts for the manufacture of polyolefins having good mechanical properties. Additionally, the presence of titanium in the support makes it possible to obtain polyolefins with very variable melt indices.

The invention consequently also relates to a catalyst for the polymerization of olefins containing chromium on a support in accordance with the invention, defined above.

The catalyst according to the invention can be obtained in a way known per se by impregnating the support powder with an aqueous or organic solution of a chromium compound, followed by drying in an oxidizing atmosphere. To this end, it is possible to use a chromium compound chosen from the soluble salts such as the oxides, the acetate, the chloride, the sulphate, the chromate and the bichromate in aqueous solution or such as the acetylacetonate in organic solution. After impregnating the support with the chromium compound, the impregnated support is generally activated by heating it at a temperature of 400° to 1000° C. in order to convert at least part of the chromium to hexavalent chromium.

The catalyst according to the invention can also be obtained by means of mechanical mixing of the powder of the support with a solid chromium compound, for example chromium acetylacetonate. This mixture can then be preactivated at a temperature below the melting temperature of the chromium compound before activating it conventionally as described above.

As a variant, the chromium compound can also be incorporated in the powder of the support during the manufacture of the latter or during the manufacture of the precursor gel of this support. To this end, it can, for example, be added, in all or in part, to the acidic solution of the aluminium compound and/or of the source of phosphate ions used in the second stage of the process according to the invention for the manufacture of a precursor gel so as to coprecipitate the oxide of chromium simultaneously with the oxide of silicon, of aluminium and/or of phosphorus. It is also possible to add the chromium compound to the precursor gel before or after the maturing of the latter.

In the catalyst according to the invention, the chromium is generally present in a proportion varying from 0.05 to 10% by weight, preferably from 0.1 to 5% by weight, more particularly from 0.25 to 2% by weight of chromium based on the total weight of the catalyst.

The catalyst according to the invention appears particularly outstanding in the polymerization of olefins. In effect, for this application, the catalyst according to the invention combines the following advantages:

a high catalytic activity even in the absence of a cocatalyst, a low, indeed non-existent, induction period, a good response to hydrogen; it additionally makes it possible to obtain polyolefins having:

a molecular mass distribution which can be adjusted from moderately broad to very broad for a given melt index, and a low oligomer content.

The catalyst according to the invention can be used for the polymerization of olefins containing from 2 to 8 carbon atoms per molecule and in particular for the production of homopolymers of ethylene or of copolymers of ethylene with one or a number of comonomers selected from the olefins described above. These comonomers are preferably propylene, 1-butene, 1-pentene, 3-methyl-1-butene, 1-hexene, the 3- and 4-methyl-1-pentenes and 1-octene. Diolefins comprising from 4 to 18 carbon atoms can also be copolymerized with ethylene. The diolefins are preferably non-conjugated aliphatic diolefins such as 4-vinylcyclohexene or alicyclic diolefins having an endocyclic bridge such as dicyclopentadiene or methylene- and ethylidenenorbornene and conjugated aliphatic diolefins such as 1,3-butadiene, isoprene and 1,3-pentadiene.

The catalyst according to the invention is particularly well suited for the manufacture of homo-polymers of ethylene and of copolymers containing at least 90%, preferably at least 95%, by weight of ethylene. The preferred comonomers are propylene, 1-butene, 1-hexene or 1-octene.

The invention consequently also relates to a process for the polymerization of olefins as defined above using a catalyst in accordance with the invention.

In the polymerization process according to the invention, polymerization can be carried out without distinction in solution, in suspension in a hydrocarbon diluent or alternatively in the gas phase. Good results are obtained in suspension polymerizations.

The suspension polymerization is carried out in a hydrocarbon diluent such as liquid aromatic, cycloaliphatic and aliphatic hydrocarbons at a temperature such that at least 80% (preferably at least 90%) of the polymer formed is insoluble therein. The preferred diluents are linear alkanes such as n-butane, n-hexane and n-heptane or branched alkanes such as isobutane, isopentane, isooctane and 2,2-dimethylpropane or cycloalkanes such as cyclopentane and cyclohexane or their mixtures.

The polymerization temperature is generally chosen between 20° and 200° C. preferably between 50° and 150° C. in particular between 80° and 115° C. The ethylene pressure is most often chosen between atmospheric pressure and 5 MPa, preferably between 0.4 and 2 MPa, more particularly between 0.6 and 1.5 MPa.

The polymerization can be carried out continuously or non-continuously, in a single reactor or in a number of reactors arranged in series, the polymerization conditions (temperature, optional comonomer content, optional hydrogen content, type of polymerization medium) in one reactor being different from those used in the other reactors.

Examples 1 to 6, the description of which follows, are used to illustrate the invention. In these examples, precursor gels of supports for catalysts were first prepared. These gels were then used to prepare the supports. Catalysts were then applied onto these supports. The supported catalysts thus obtained were employed to polymerize ethylene.

In Examples 5 and 6, titanium was incorporated into the precursor gel.

The meaning of the symbols used expressing the quantities mentioned and the methods of measuring these quantities are explained below SS=specific surface of the support measured by the method of penetration with nitrogen according to the volumetric method of British standard BS 4359/1 (1984).

PV=pore volume of the support, equal to the sum of the pore volume consisting of pores with a radius less than or equal to 75 Å, measured by the method of penetration with nitrogen according to the volumetric method of British standard BS 4359/1 (1984), and of the pore volume measured by the method of penetration with mercury by means of the porosimeter of Poro 2000 type marketed by Carlo Erba Co, according to Belgian standard NBN B 05-202 (1976).

$T_c$=crystallization temperature determined by means of the method defined above.

OF=oligomer fraction of the polymer, expressed in grams of oligomers per kilo of polymer and measured by extracting with hexane at the boiling temperature of hexane.

α=catalytic activity expressed in grams of polymer obtained per hour and per gram of catalyst used and divided by the partial pressure of the olefin expressed in bars.

$T_{ind}$=induction time, expressed in minutes and defined as being the time passed between introduction of the ethylene and the appearance of a pressure reduction characteristic of the beginning of polymerization.

HLMI=melt index of the molten polymer at 190° C. measured under a load of 21.6 kg and expressed in g/10 min, according to the ASTM standard D1238 (1986).

$\eta_0/\eta_2$=ratio between the dynamic viscosity ($\eta_0$), expressed in dPa.s and measured at a rate gradient of 1 s$^{-1}$ and at 190° C. and the dynamic viscosity ($\eta_2$), expressed in dPa.s and measured at a rate gradient of 100 s$^{-1}$ and at 190° C.

Examples 1 to 4 (in accordance with the inventions

A. Preparation of a precursor gel a) First stage

A solution of water and of 1M hydrochloric acid was added dropwise to a solution of silicon tetraethoxide and ethanol, thermostatically controlled at 10° C., so as to obtain an H$^+$ concentration of 0.1M. The amounts of silicon tetraethoxide, ethanol, water and hydrochloric acid which were used are presented in Table I. The hydrolysis medium thus obtained was then matured at 60° C. for 2 hours.

b) Second stage

An aqueous solution containing hydrated aluminium chloride and phosphoric acid was prepared, the amounts used being represented in Table I. The solution thus obtained was then added to the hydrolysis medium obtained in (a) with vigorous stirring and at 10° C.

c) Third stage

The mixture obtained in (b) was added to 500 g of an aqueous ammonium hydroxide solution with a pH of 8, thermostatically controlled at 10° C. the pH being kept constant at a value of 8, in order to carry out gelling.

d) Maturing

The gel obtained in (c) was matured at a pH of 8, for 2 hours, with gentle stirring and at 60° C.

B. Preparation of a catalyst support a) Washing

The gel obtained in A was washed, first 3 times with water and then once by means of isopropanol.

b) Drying

The washed gel obtained in (a) was distilled of the water/isopropanol azeotrope at ambient pressure and then of the isopropanol, first at ambient pressure and then at reduced pressure, so as to obtain a powder whose moisture content is below 1% by weight.

c) Calcination

The powder obtained in (b) was calcined in a fluidized bed while purging with dry air, for 4 hours at 500° C. A powder of a support was recovered whose composition (mol % of silica, alumina and aluminium phosphate), specific surface, pore volume and crystallization temperature are represented in Table I.

TABLE I

| Example | 1 | 2 | 3 | 4 |
|---|---|---|---|---|
| First stage: amount used of: | | | | |
| silicon tetraethoxide (g) | 43.4 | 60.8 | 23.2 | 4.96 |
| ethanol (g) | 52.1 | 70.9 | 27.8 | 5.95 |
| water (g) | 23.1 | 32.5 | 12.3 | 2.63 |
| 1M hydrochloric acid (g) | 15.0 | 20.7 | 8.0 | 1.71 |
| Second stage: quantity used of: | | | | |
| AlCl$_3$.6H$_2$O (g) | 30.2 | 10.1 | 53.7 | 74.73 |
| 85% phosphoric acid (g) | 14.0 | 4.8 | — | 2.74 |
| water (g) | 24.5 | 8.8 | — | 61.9 |
| hydrochloric acid of pH 0.8 (g) | — | — | 50.0 | — |
| Support obtained: composition: | | | | |
| SiO$_2$ (mol %) | 64.3 | 91.1 | 50.0 | 10.3 |
| Al$_2$O$_3$ (mol %) | 2.6 | 4.6 | 50.0 | 76.6 |
| AlPO$_4$ (mol %) | 33.1 | 4.3 | — | 13.1 |
| SS (m$^2$/g) | 240 | 601 | 422 | 358 |
| PV (cm$^3$/g) | 3.58 | 2.79 | 2.46 | 2.69 |
| T$_c$ (°C.) | >1000 | >700 | >1000 | >700 |

C. Preparation of a catalyst

The support obtained in B was mixed with chromium acetylacetonate in an amount such that the mixture comprises 0.7% by weight of chromium. The mixture thus obtained was then treated in a fluidized bed at 150° C. for 2 hours under a dry air purge. It was then calcined in the fluidized bed at 700° C. for 5 hours under dry air and the catalyst was recovered.

D. Polymerization of ethylene a) Polymerization in the absence of hydrogen 100 mg of the catalyst obtained in C and 1 litre of isobutane were introduced into a 3 litre autoclave dried beforehand and equipped with a stirrer. The temperature was raised to 99° C. and ethylene was introduced into the autoclave at a partial pressure of 1.09 MPa. The ethylene pressure and the temperature were kept constant during the time necessary for the production of a defined amount of polyethylene. After degassing, the polymer was recovered in the form of particles, the properties of which are collated in Table II, as well as the activity of the catalyst.

b) Polymerization in the presence of hydrogen

The same operations were repeated, hydrogen being additionally introduced into the autoclave at a partial pressure of 0.44 MPa. The results obtained are also taken up in Table II.

TABLE II

| Example | 1 | 2 | 3 | 4 |
|---|---|---|---|---|
| a) Without H$_2$ | | | | |
| α | 44045 | 40660 | 22724 | 8970 |
| T$_{ind}$ | 0 | 8 | 8 | 0 |

TABLE II-continued

| Example | 1 | 2 | 3 | 4 |
|---|---|---|---|---|
| HLMI | 0.6 | 2.2 | <0.1 | <0.1 |
| OF | 8.9 | 7.1 | 5.5 | 9.0 |
| $\eta_0/\eta_2$ | 23.6 | 16.1 | — | 47.7 |
| b) With $H_2$ | | | | |
| HLMI | 2.1 | 4.2 | 0.3 | 0.5 |

Examples 5 and 6 (in accordance with the invention)

A. Preparation of a precursor gel a) First stage

A solution of water and 1M hydrochloric acid was added dropwise to a solution of silicon tetraethoxide and ethanol, thermostatically controlled at 10° C., so as to obtain an $H^+$ concentration of 0.1M. The amounts of silicon tetraethoxide, ethanol, water and hydrochloric acid which were used are presented in Table III. The hydrolysis medium thus obtained was then matured at 60° C. for 1 hour. A solution of titanium acetylacetonate in isopropanol was then added thereto in an amount appropriate for obtaining the Ti content shown in Table III. The maturing was continued for a further 1 hour at 60° C., during which the pH was kept at 1 by adding an appropriate amount of hydrochloric acid thereto.

b) Second stage

An aqueous solution containing hydrated aluminium chloride and phosphoric acid was prepared, the amounts used being represented in Table III. The solution thus obtained was then added to the hydrolysis medium obtained in (a) with vigorous stirring and at 10° C.

c) Third stage

The mixture obtained in (b) was added to 500 g of an aqueous ammonium hydroxide solution with a pH of 8, thermostatically controlled at 10° C. the pH being kept constant at a value of 8, in order to carry out gelling.

d) Maturing

The gel obtained in (c) was matured at a pH of 8, for 2 hours, with gentle stirring and at 60° C.

B. Preparation of a catalyst support a) Washing

The gel obtained in A was washed, first 3 times with water and then once by means of isopropanol.

b) Drying

The washed gel obtained in (a) was distilled of the water/isopropanol azeotrope at ambient pressure and then of the isopropanol, first at ambient pressure and then at reduced pressure, so as to obtain a powder whose moisture content is below 1% by weight.

c) Calcination

The powder obtained in (b) was calcined in a fluidized bed while purging with dry air, for 4 hours at 500° C. A powder of a support was recovered whose composition (mol % of silica, alumina and aluminium phosphate), specific surface, pore volume and crystallization temperature are represented in Table III.

TABLE III

| Example | 5 | 6 |
|---|---|---|
| First step amount used of: | | |
| silicon tetraethoxide (g) | 33.0 | 32.3 |
| ethanol (g) | 39.6 | 38.8 |
| water (g) | 17.7 | 17.5 |
| 1M hydrochloric acid (g) | 11.0 | 10.8 |
| titanium acetylacetonate (*) | 8.1 | 16.7 |
| Second stage: quantity used of: | | |
| $AlCl_3 \cdot 6H_2O$ (g) | 38.2 | 37.5 |
| 85% phosphoric acid (g) | 18.3 | 17.9 |
| water (g) | 31.9 | 31.0 |
| Support obtained: composition: | | |
| Si (% by wt) | 13.9 | 13.2 |
| Al (% by wt) | 14.0 | 12.7 |
| P (% by wt) | 15.5 | 15.1 |
| Ti (% by wt) | 3.0 | 6.7 |
| SS ($m^2/g$) | 349 | 300 |
| PV ($cm^3/g$) | 4.87 | 3.88 |
| $T_c$ (°C.) | >900 | >700 |

(*) 75% solution in isopropanol

C. Preparation of a catalyst

The support obtained in B was mixed with chromium acetylacetonate in an amount such that the mixture comprised 0.63% by weight of chromium. The mixture thus obtained was then treated in a fluidized bed at 150° C. for 2 hours under a dry air purge. It was then calcined in the fluidized bed at 700° C. for 5 hours under dry air and the catalyst was recovered.

D. Polymerization of ethylene 100 mg of the catalyst obtained in C and 1 litre of isobutane were introduced into a 3liter autoclave dried beforehand and equipped with a stirrer. The temperature was raised to 104° C. and ethylene was introduced into the autoclave at a partial pressure as shown in Table IV. Optionally, hydrogen was additionally introduced into the autoclave at a pressure as shown in Table IV. The ethylene pressure and the temperature were kept constant during the time necessary for the production of a defined amount of polyethylene. After degassing, the polymer was recovered in the form of particles, the properties of which are collated in Table IV, as well as the activity of the catalyst.

TABLE IV

| Example | 5 | 6 |
|---|---|---|
| ethylene partial pressure (MPa) | 0.77 | 0.79 |
| $H_2$ partial pressure (MPa) | — | 0.29 |
| α | 30636 | 20646 |
| $T_{ind}$ | 7 | not measured |
| HLMI | 32 | 74 |
| OF | 15 | not measured |
| $\eta_0/\eta_2$ | 8.24 | not measured |

We claim:

1. A support for catalysts of homogeneous and amorphous structure, containing silica, aluminium phosphate, and optionally alumina, said support having a specific surface of 100 to 800 $m^2/g$, a crystallization temperature greater than or equal to 700° C. and a pore volume of 1.5 to 4 $cm^3/g$, the specific surface (SS) and the pore volume (PV) corresponding to the following relationship:

$$SS<(PV \times 564-358),$$

in which SS and PV respectively denote the numerical values of the specific surface, expressed in $m^2/g$, and of the pore volume, expressed in $cm^3/g$.

2. The support according to claim 1, consisting of two constituents, one of which is silica (A) and the other (B) aluminium phosphate, in an (A):(B) molar percentage of (10 to 95):(90 to 5) based on the total moles of (A) and (B).

3. The support according to claim 1, wherein it contains silica (X), alumina (Y) and aluminium phosphate (Z), in an (X):(Y):(Z) molar percentage of (10 to 95):(1 to 80):(1 to 85) based on the total moles of (X), (Y), and (Z).

4. The support according to claim 1, including titanium in an amount, expressed as $TiO_2$, of from 0.1 to 40 mol % based on the total moles of silica, aluminum phosphate, titanium dioxide, and optionally alumina.

5. The support according to claim 1, having a standard density of 50 to 500 $kg/m^3$.

6. A catalyst for the polymerization of olefins containing chromium on a support in accordance with claim 1.

7. A process for the polymerization of olefins in the presence of a catalyst in accordance with claim 6.

8. The process according to claim 7, applied to the polymerization of ethylene.

9. A process for the preparation of the support as defined in claim 1, including:
   preparing a precursor gel by means of a process comprising in a first stage, mixing an alcohol, water, a silicon alkoxide and an acid in amounts such that the water/silicon molar ratio is from 2 to 50 in order to form a hydrolysis medium, mixing an acidic solution of an aluminium compound and a solution of a source of phosphate ions, in a second stage, and, in a third stage, adding a gelling agent to the hydrolysis medium thus obtained in order to form a precursor gel, wherein the first stage is carried out at acid pH and comprises, on the one hand, the addition of water, acid, silicon alkoxide and alcohol, the temperature, during the addition, being less than or equal to 30° C. and, on the other hand, a maturing of the hydrolysis medium thus obtained at a temperature at least equal to 20° C. and lower than the boiling temperature of the medium, so as to substitute at least part of the alkoxy groups of the silicon alkoxide by hydroxyl group, without producing precipitation or gelling of silica,
   washing the gel with water and then by means of an organic liquid,
   drying said washed gel by distillation until a powder is obtained, and
   calcining the powder to produce a support for catalysts of homogeneous and amorphous structure.

10. The process according to claim 9, wherein the organic liquid is an alcohol.

11. Process according to claim 10, characterized in that the organic liquid is isopropyl alcohol.

12. Process according to claim 9, characterized in that the drying is carried out by distillation of an azeotropic mixture of water and of the organic liquid until at least 98% of the water and part of the organic liquid have been removed, followed by a distillation of the other part of the organic liquid.

13. The process according to claim 9, wherein the silicon alkoxide is an aliphatic silicon alkoxide.

14. The process according to claim 13, wherein the silicon alkoxide is silicon tetraethoxide.

15. The process according to claim 9, wherein the acid used in the first stage is hydrochloric acid.

16. The process according to claim 9, including, in the first stage, a titanium alkoxide.

17. The process according to claim 9, wherein the titanium alkoxide is added during the maturing.

18. The process according to claim 9, including, in the first stage, titanium acetylacetonate.

19. The process according to claim 9, wherein the aluminium compound is an inorganic aluminium salt or an aluminium alkoxide.

20. The process according to claim 19, wherein the inorganic aluminium salt is aluminium nitrate or aluminum chloride.

21. The process according to claim 9, wherein the source of phosphate ions is phosphoric acid.

22. The process according to claim 9, wherein the gelling agent is an aqueous ammonium hydroxide solution.

23. The process according to claim 9, wherein, in the first stage, the maturing is carried out at a temperature of 50° to 70° C.

24. The process according claim 9, wherein the second stage is carried out at a temperature below or equal to 20° C.

25. The process according to claim 9, wherein the third stage is carried out in a medium with a constant pH, the value of which is from 6 to 10, and at a temperature below or equal to 30° C.

26. The process according to claim 9, wherein, on conclusion of the third stage, a gel is recovered which is subjected to a maturing.

27. The process according to claim 26, wherein the maturing of the gel is carried out at a temperature which can vary from room temperature to the boiling temperature of the maturing medium and at a pH greater than or equal to 6.

28. A process for the manufacture of a precursor gel of a support for a catalyst, including steps for, in a first stage, mixing an alcohol, water, a silicon alkoxide and an acid in amounts such that the water/silicon molar ratio is from 2 to 50, adding an acidic solution of an aluminium compound and/or a solution of a source of phosphate ions, in a second stage, and, in a third stage, adding a gelling agent to the hydrolysis medium thus obtained, the first stage being carried out at acid pH and the temperature during the addition of water, acid, silicon, alkoxide and alcohol being less than or equal to 30° C. and, the first stage also including a maturing of the hydrolysis medium thus obtained at a temperature at least equal to 20° C. and lower than the boiling temperature of the medium, so as to substitute at least part of the alkoxy groups of the silicon alkoxide by hydroxyl groups, without producing precipitation or gelling of silica.

29. The process according to claim 28, wherein the silicon alkoxide is an aliphatic silicon alkoxide.

30. The process according to claim 29, wherein the silicon alkoxide is silicon tetraethoxide.

31. The process according to claim 28, characterized in that the acid used in the first stage is hydrochloric acid.

32. The process according to claim 28, wherein, in the first stage, a titanium alkoxide is additionally used.

33. The process according to claim 32, wherein the titanium alkoxide is added during the maturing.

34. The process according to claim 28, including, in the first stage, titanium acetylacetonate.

35. The process according to claim 28, wherein the aluminium compound is selected from inorganic aluminium salts and aluminium alkoxides.

36. The process according to claim 35, wherein the inorganic aluminium salts are chosen from aluminium nitrate and chloride.

37. The process according to claim 28, wherein the source of phosphate ions is phosphoric acid.

38. The process according to claim 28, wherein the gelling agent is an aqueous ammonium hydroxide solution.

39. The process according to claim 28, wherein in the first stage, the maturing is carried out at a temperature of 50° to 70° C.

40. The process according to claim 28, wherein the second stage is carried out at a temperature below or equal to 20° C.

41. The process according to claim 28, wherein the third stage is carried out in a medium with a constant pH, the value of which is from 6 to 10, and at a temperature below or equal to 30° C.

42. The process according to claim 28, wherein on conclusion of the third stage, a gel is recovered which is subjected to a maturing.

43. The process according to claim 42, wherein the maturing of the gel is carried out at a temperature which can vary from room temperature to the boiling temperature of the maturing medium and at a pH greater than or equal to 6.

* * * * *